(12) United States Patent
Kaler et al.

(10) Patent No.: US 7,640,260 B2
(45) Date of Patent: Dec. 29, 2009

(54) VALID TRANSFORMATION EXPRESSIONS FOR STRUCTURED DATA

(75) Inventors: Christopher G. Kaler, Sammamish, WA (US); Donald F. Box, Bellevue, WA (US); Martin Gudgin, Sale (GB)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 11/299,428

(22) Filed: Dec. 12, 2005

(65) Prior Publication Data

US 2007/0136338 A1 Jun. 14, 2007

(51) Int. Cl.
*G06F 7/00* (2006.01)
*G06F 17/00* (2006.01)
(52) U.S. Cl. .................... 707/101; 707/103 Y
(58) Field of Classification Search ........... 707/1–10, 707/100–104.1, 200–206; 715/513, 234
See application file for complete search history.

(56) References Cited

U.S. PATENT DOCUMENTS

| | | | | |
|---|---|---|---|---|
| 6,104,393 | A | 8/2000 | Santos-Gomez | 345/336 |
| 6,424,360 | B1 | 7/2002 | Torres | 345/810 |
| 6,598,219 | B1 | 7/2003 | Lau | 717/108 |
| 6,842,877 | B2 | 1/2005 | Robarts et al. | 715/708 |
| 6,847,387 | B2 | 1/2005 | Roth | 345/811 |
| 6,904,565 | B1 | 6/2005 | Lentz | 715/705 |
| 6,925,609 | B1 | 8/2005 | Lucke | 715/804 |
| 6,970,791 | B1 | 11/2005 | Potter et al. | 702/31 |
| 2002/0004933 | A1 | 1/2002 | Dzoba et al. | 717/4 |
| 2003/0204503 | A1 | 10/2003 | Hammer et al. | 707/6 |
| 2004/0078802 | A1 | 4/2004 | Hammer et al. | 719/318 |
| 2005/0120029 | A1* | 6/2005 | Tomic et al. | 707/100 |
| 2005/0132361 | A1 | 6/2005 | Uchida et al. | 717/178 |
| 2006/0031780 | A1 | 2/2006 | Schlotzhauer et al. | 715/805 |
| 2006/0085451 | A1* | 4/2006 | Pal et al. | 707/100 |

FOREIGN PATENT DOCUMENTS

WO WO/01/39409 5/2001

OTHER PUBLICATIONS

Jingtao Zhou et al., An XML-based schema translation method for relational data sharing and exchanging, May 26-28, 2004, vol. 1, 714-717.*
Yuliana et al., XML schema re-engineering using a conceptual schema approach, Apr. 4-6, 2005, IEEE, vol. 1, 255-260.*
Van Bommel et al., Database design by computer-aided schema transformations, Jul. 1995, IEEE, vol. 10, 125-132.*
Antonio C. Siochi, et al, "*Task-Oriented Representation of Asynchronous User Intefaces*," May 1989, Department of Computer Science Virginia Tec, available at http://delivery.acm.org/10.1145/70000/67487/p183siochi.pdf?key1=67487&key2=3445989311&coll=GUIDE&dl=GUIDE&CFID=68443271&CFTOKEN=27370617 (PDF enclosed entitled Article 1, 8 pages).
Costin Pribeanu, et al., "Exploring Design Heuristics for User Interface Derivation From Task And Domain Models," Chapter 9, *Computer-Aided Design of User Interfaces III*, Proceedings of the Fourth International Conference on Computer-Aided Design of User Interfaces, May 15-17, 2002, Valenciennes, France, pp. 103-110. available at http://www.isys.ucl.ac.be/bchi/publications/2002/Pribeanu-CADUI2002.pdf (PDF enclosed entitled Article 2, 38 pages).
Eberhard Ulich, et al., "*Task Orientation and User-Oriented Dialog Design*," Published in "International Journal of Human-Computer Interaction" 1991, vol. 3(2), pp. 117-144, available at http://www.idemployee.id.tue.nl/g.w.m.rauterberg/publications/IJHCI91paper.pdf (PDF enclosed entitled Article 3, 8 pages).

* cited by examiner

*Primary Examiner*—Jean B Fleurantin
(74) *Attorney, Agent, or Firm*—Workman Nydegger

(57) ABSTRACT

Structuring a data structure that is of a particular type that has a particular schema used for validation, in a manner that permits selected components of the data structure to be optionally transformed while retaining the ability to validate the data structure. The data structure includes information that is sufficient to identify one or more transformations that may occur on at least one component of the data structure while still being valid.

17 Claims, 6 Drawing Sheets

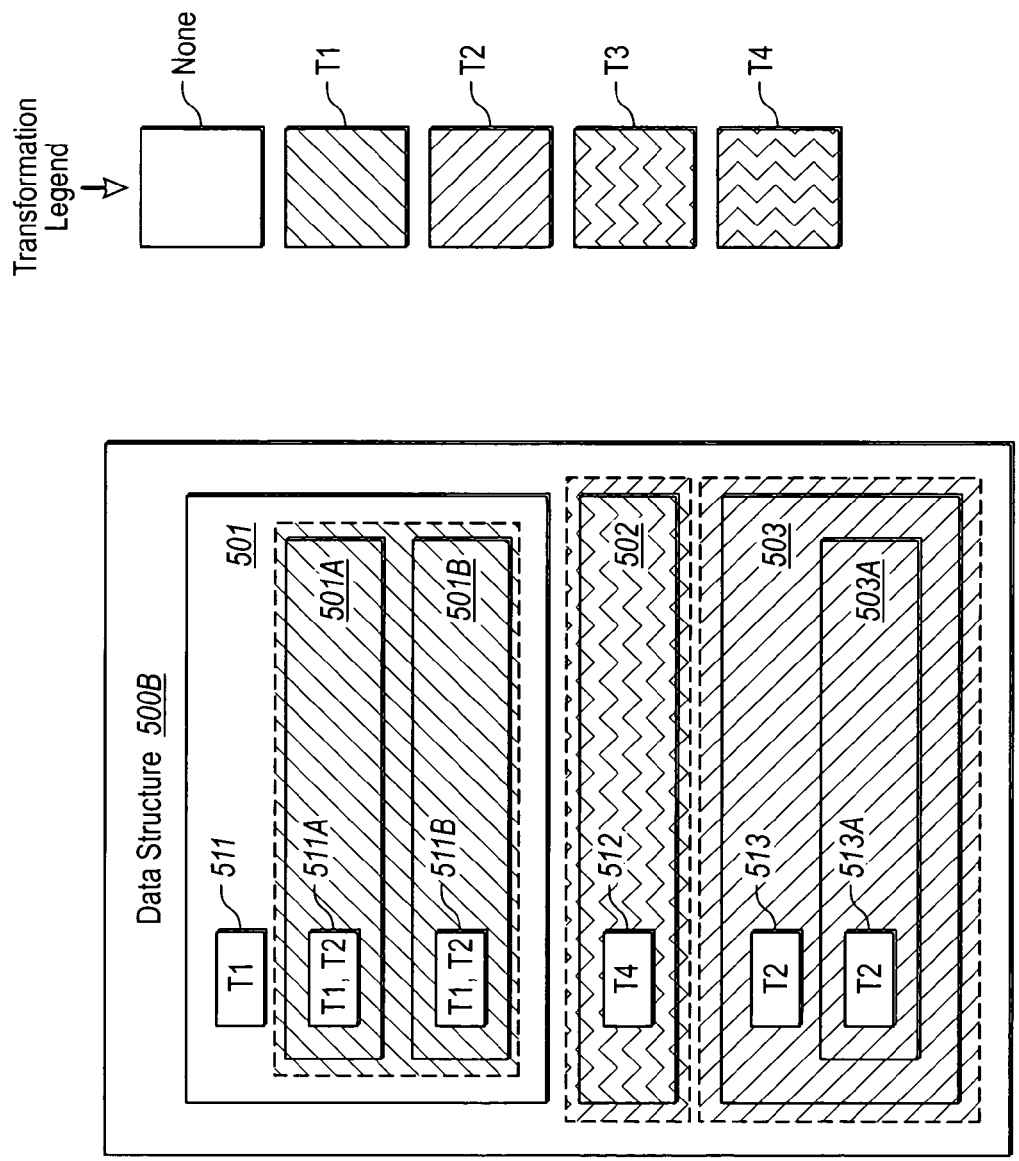

VALID TRANSFORMATION EXPRESSIONS FOR STRUCTURED DATA

BACKGROUND

Computing technologies have transformed our world. However, in order to prove useful, computing relies on the ability to access information. In the computing world, information is typically expressed as data structured in a specific defined structural form often referred to in the art as a "schema".

For instance, a Simple Object Access Protocol (SOAP) envelope is a common message data structure expressed as a collection of eXtensible Markup Language (XML) elements. The SOAP envelope follows a set of rules (often called an XML schema) regarding the identity of the XML elements, the attributes of the XML elements, and the hierarchical relation of those XML elements. There are currently hundreds, if not thousands, of XML schema that define the form of various XML data structures. For instance, there may be different schemas for a SOAP envelope depending on the specific function of the SOAP envelope. A connection request SOAP envelope may have one XML schema, whereas a stock valuation report SOAP envelope may have a substantially different XML schema.

Schemas may be found outside the world of XML as well. For instance, a Remote Procedure Call (RPC) message follows a schema known in the art as ASN.1. In fact, any data that includes multiple interrelated fields may be said to have a schema.

It is often helpful to validate a data structure as truly following a given set of organizational rules or schemas. However, data structures can often undergo transformations not anticipated when the organizational rules and schemas were originally set up. For instance, consider the following example XML element that describes a purchase order:

```
<Purchase Order>
    <ID> AC5003SEP05</>
    <Vendor> ABC Patent Supply </>
    <Total> $105.67</>
</Purchase Order>
```

When originally defining this XML element, the designer may define a schema for the Purchase Order element that includes three child XML elements; a first being a string representing the purchase order ID, a second being a string for representing the vendor name, and a third being a floating point value representing the total currency involved with the purchase order. That seems a completely reasonable and intuitive way for defining a schema for a purchase order XML element.

However, during the lifetime of that purchase order XML element, the element or portions thereof may undergo some transformation. For instance, as the purchase order XML element is transmitted from one location to another, it may be desirable to encrypt a portion of the element so as to hide information from public view. For instance, the total amount XML element may be encrypted if there is sensitivity to disclosing that amount. Furthermore, if bandwidth is limited, perhaps the content of the purchase order XML is compressed.

When performing validation of a data structure such as the example purchase order XML element, it is often only the untransformed data structure that is validated. When performing a validation, the various components of the data structure are compared against the expected structural rules in the form of a validation schema. If attempts are made to validate a transformed form of the data structure, the validation may fail since the structural rules may not recognize the transformed data structure as a valid interim representation of the data structure. For instance, if the entire content of the purchase order XML element is compressed, the validation engine will often not see the children XML elements, but will just see compressed content. Accordingly, validation may fail.

One alternative is to define several schemas for a particular data structure. For instance, one could define a second schema for the purchase order XML element in which the purchase order XML element has a single XML element named "Compressed Content". However, this requires the generation and proliferation of a second schema. The data structure may be exposed to a variety of transformation including compression, encryption, digitally signing, and others so it may be cumbersome to work with a schema representing each permutation of possible transformations.

BRIEF SUMMARY

The principles of the present invention relate to the structuring of a data structure that is of a particular type that has a particular schema used for validation, in a manner that permits selected components of the data structure to be optionally transformed while retaining the ability to validate the data structure. The data structure includes information that is sufficient to identify one or more transformations that may occur on at least one component of the data structure while still being valid despite the transformation being in contravention of the schema used to validate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5B illustrates the data structure of FIG. 5A in a third stage in which several other portions of the data structure have been further subjected to transformations.

DETAILED DESCRIPTION

The principles of the present invention related to a mechanism for structuring a data structure that is of a particular type that has a particular schema used for validation, in a manner that permits selected components of the data structure to be optionally transformed while retaining the ability to validate the data structure. First, a general computing system will be described with respect to FIG. 1, as being a suitable computing system that may be used to practice the principles of the present invention. Then, the principles of the present invention will be described with respect to FIGS. 2, 3, 4, 5A and 5B.

Figure 1:
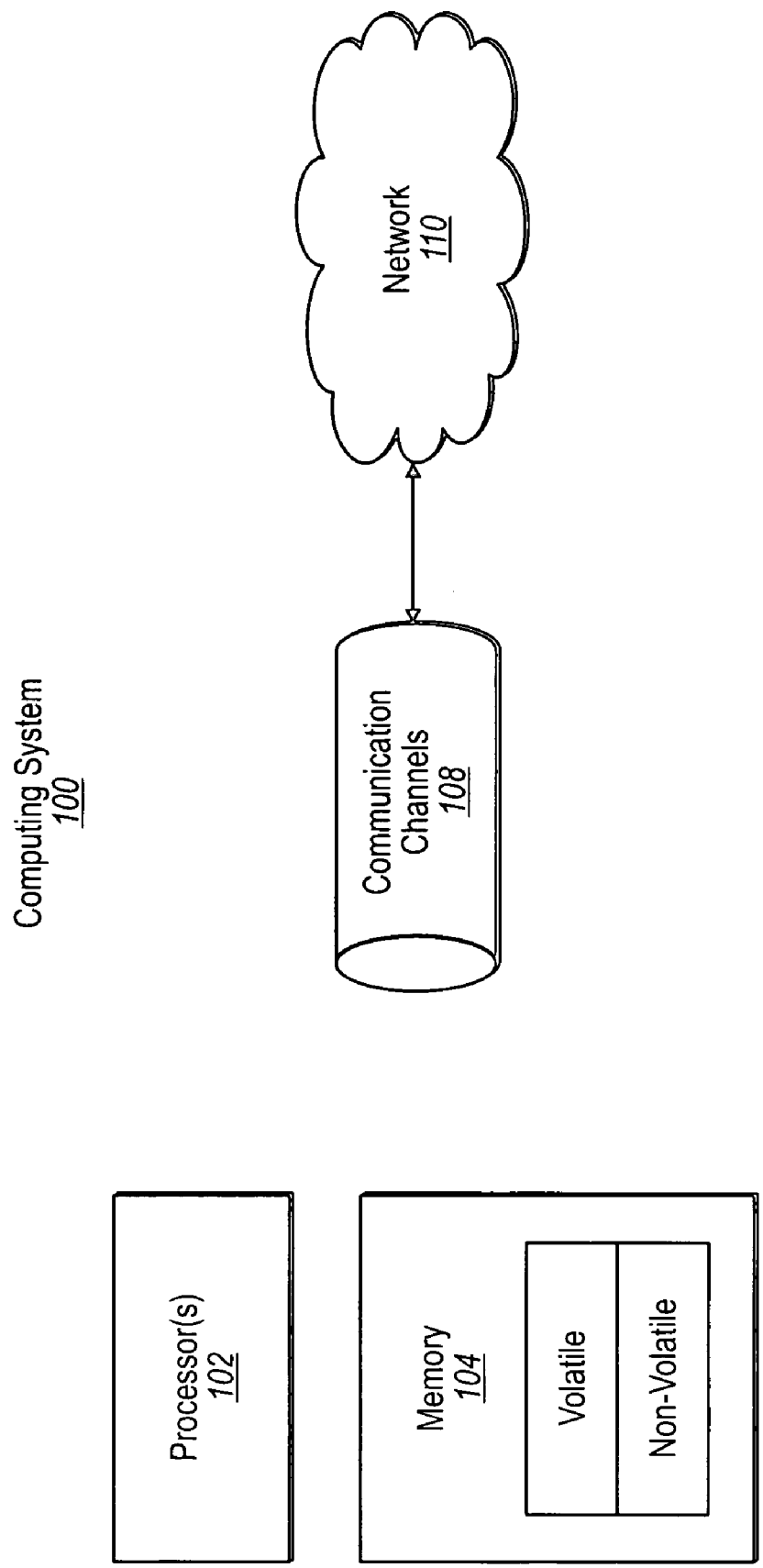
FIG. 1 illustrates a suitable computing system that may implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

As used herein, the term "module" or "component" can refer to software objects or routines that execute on the computing system. The different components, modules, engines, and services described herein may be implemented as objects or processes that execute on the computing system (e.g., as separate threads) as part of a protocol. While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

As previously described, a data structure with multiple components may initially be in a state that conforms to a schema corresponding to the particular type of data structure, but only later have components thereof subjected to transformation(s). The transformed data structure may no longer conform to the schema. The principles of the present invention allow for a convenient mechanism for expressing valid transformations that may occur in the data structure, while still remaining a valid data structure. Specifically, the data structure may be transformed within certain defined bounds, even if the transformed data structure no longer conforms to the initial schema, while allowing the data structure to be recognized as valid in its transformed state.

Figure 2:
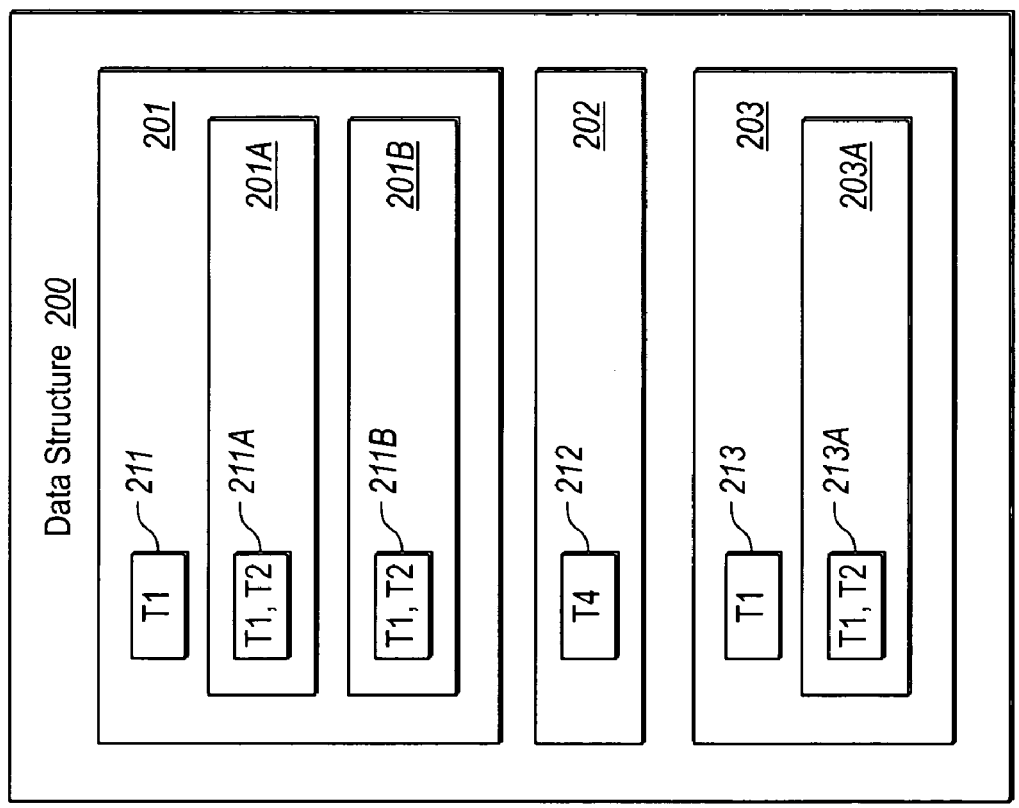
FIG. 2 illustrates a hierarchically-structured data structure in which its various components may be legitimately subjected to a variety of defined transformations.

FIG. 2 illustrates a data structure 200 in accordance with the principles of the present invention. The data structure 200 includes six distinct components, components 201, 201A, 201B, 202, 203, and 203A. Although the data structure 200 is shown as including six components, the principles of the present invention may be applied to any data structure that includes any number of components.

The data structure 200 is illustrated as being a hierarchical data structure. In this description and in the claims, a "hierarchical data structure" is defined as any data structure that includes multiple components in which one component may contain or be associated with one or more child components. For instance, the data structure 200 includes a parent component 201 that has associated therewith two child components 201A and 201B, and a parent component 203 that has associated therewith one child component 203A, and a component 202 that has no child components. An example of a hierarchically-structured data structure is any eXtensible Markup Language (XML) document such as, for example, a Simple Object Access Protocol (SOAP) envelope. The blocks 211, 211A, 211B, 212, 213 and 213A represent transformation information that will be described further below. Although the hierarchical data structure 200 is illustrated by way of example, the principles of the present invention may apply to any data structure having multiple components.

Figure 3:
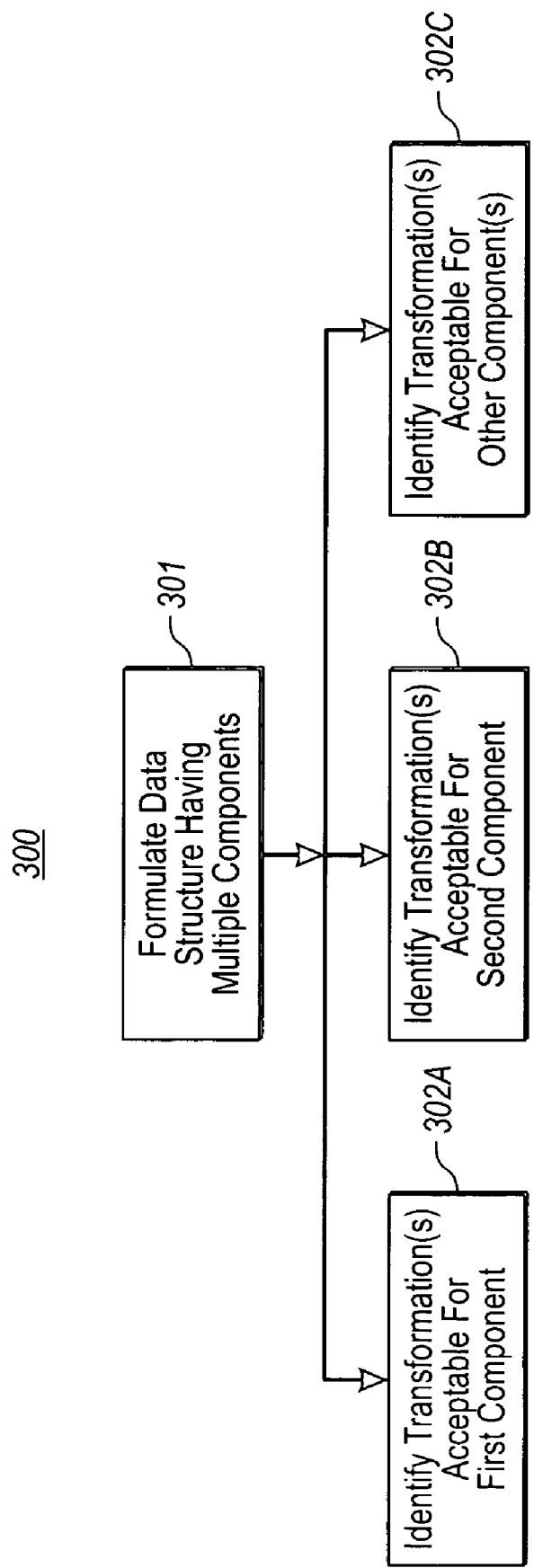
FIG. 3 illustrates a method for formulating such a hierarchically-structured data structure in accordance with the principles of the present invention.

FIG. 3 illustrates a flowchart of a method 300 for formulating a data structure of a particular type that has a particular schema used for validation, in a manner that permits components of the data structure to be optionally transformed while retaining the ability to validate the data structure. The method 300 of FIG. 3 will be described with frequent reference to the data structure 200 of FIG. 2, and may be performed by a computing system such as, for example, the computing system 100 of FIG. 1.

The computing system formulates a data structure that includes multiple components (act 301). For instance, the computing system may formulate the data structure 200 schematically illustrated in FIG. 2. The data structure is of a particular type that has a particular schema used for validation.

Concurrent with or after the multiple components are formulated, the computing system provides information in the data structure that is sufficient to identify one or more transformations that may occur on at least one component of the data structure while still being valid as an interim representation of the data structure (act 302A). This act may be repeated for multiple components of the data structure as represented by the acts 302B and 302C. Rather than having to identify an alternative schema that conforms to the transformed data structure, the transformation information may be used instead to identify valid transformations that may be performed on a particular data structure that follows the schema.

For instance, referring to data structure 200, blocks 211, 211A, 211B, 212, 213 and 213A represent information (hereinafter also referred to a "transformation information") that is sufficient to identify one or more transformations that occur on the respective components 201, 201A, 201B, 202, 203 and 203A. In this example, transform T1 is a valid transformation for components 201 and 203, transforms T1 and T2 are valid transformations for components 201A, 201B and 203A, and transform T4 is a valid transformation of component 202. The terms T1, T2, T3 (hereafter introduced) and T4 are simply abstract terms representing an identification of a transform or a set of transforms.

The transformation information provided to identify the valid transforms may be fully expressed in the data structure itself, partial expressed, or fully implied. For instance, in the fully expressed case, the information may completely express the full identity of the transform such that the computing system need not refer to any information external to the data structure 200 in order to identify the valid transformation(s) for that component.

As an example, the transformation information may specify the valid transformation by the known name of the transform. For example, if the data structure was a SOAP envelope and the component was an XML element within the SOAP envelope, the XML element may have an attribute or a constituent child XML element that expressly identifies the transformation (e.g., "XML compression"). Alternatively, although FIG. 2 illustrates the transformation information corresponding to a particular component as being within the corresponding component, the transformation information may be outside of the components as well. For instance, the transformation information may be within the SOAP header, and describe transforms suitable for one or more XML elements within the SOAP body.

In the partially expressed case, the transformation information includes an expression that is correlated with the valid transformations, but that requires some outside information in order to identify the transformations. For example, the expression may be an abbreviation or substitute name for a transformation, in which case the computing system may use external information to map the expression to the identity of the valid transformations. Alternatively or in addition, the expression could correlate to a group of autonomous transformations. For instance, an expression of "compression" may indicate that any compression transformation within a list of compression algorithms may be used to transform that component; an expression of "encryption" may indicate that any encryption transformation within a list of encryption algorithms may be used to transform that component; and/or an expression of "signature" may indicate that any digital signing transformation with a list may be used to transform that component. An expression of "AnyXForm" may indicate that any transformation (compression, encryption, digital signing, or others) may be used to transform that component.

In the fully implied case, the identification of the component itself implies the valid transformations that may be performed on the component, with or without the presence of information external to the data structure. For instance, a schema, Web Service Description Language (WSDL) document, a policy document, and/or any other information source may be used to imply that, based on the identity of the component itself, that there are certain transformations that may be performed on that component.

Figure 4:
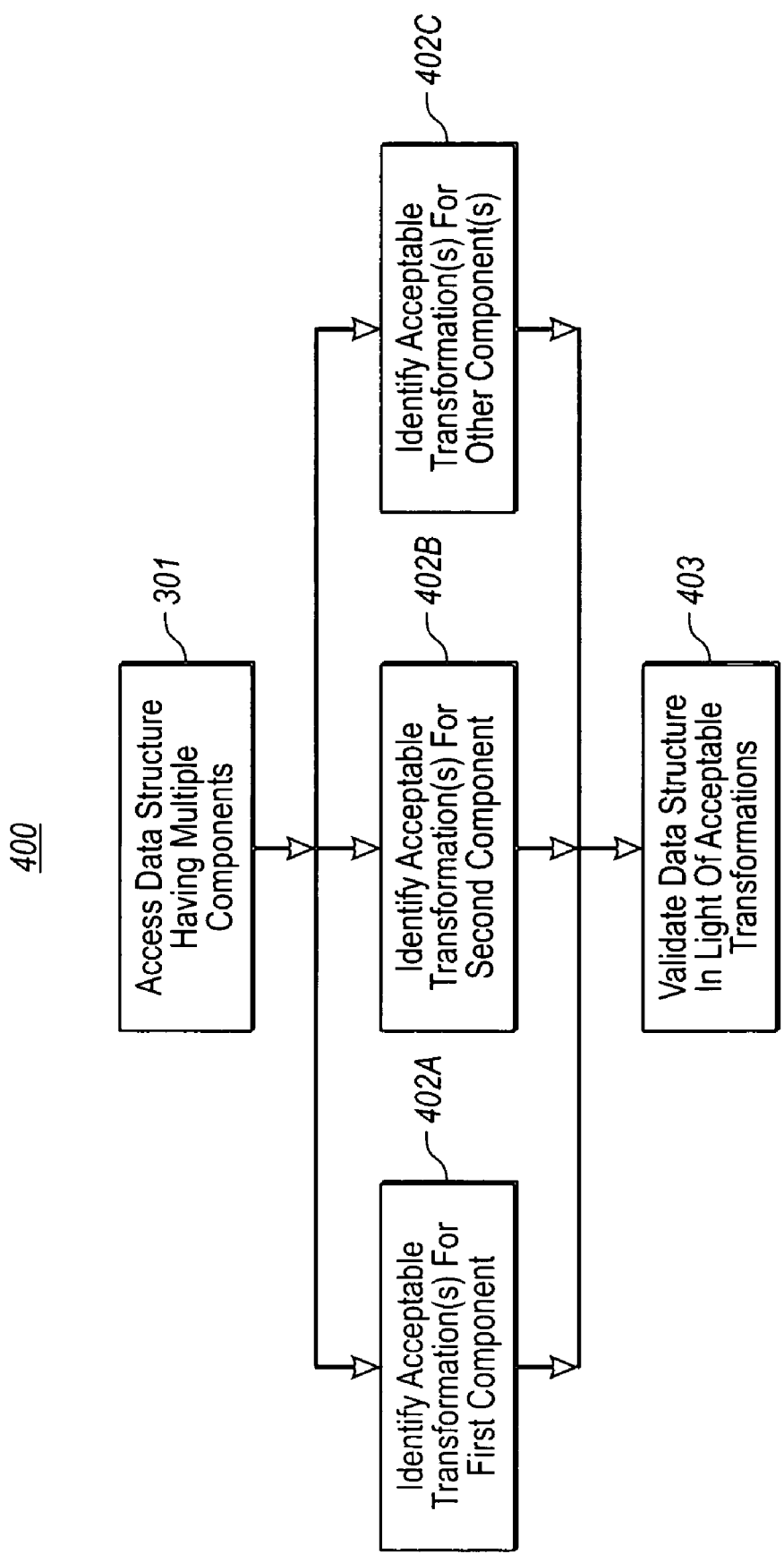
FIG. 4 illustrates a method for accessing and potentially using the hierarchically-structured data structure in accordance with the principles of the present invention.

FIG. 4 illustrates a flowchart of a method 400 for accessing a data structure of a particular type that has a particular schema used for validation, in a manner that permits components of the data structure to be optionally transformed while retaining the ability to validate the data structure. The data structure (such as the data structure 200 of FIG. 2) is first accessed (act 401), and then the transformation information provided for the component(s) of the data structure are used to identify valid transformations for the component(s). For instance, referring to the data structure 200 of FIG. 2, transformation information 211 and 213 may be used to identify that the valid transformations for components 201 and 203 is simply transformation T1. Transformation information 211A, 211B, and 213A may be used to identify that the valid transformations for components 201A, 201B, and 203A are transformations T1 and T2. Transformation information 212 may be used to identify that the valid transformations for component 202 is simply transformation T4. This may be performed for multiple components of the data structure as represented by the acts 402A, 402B and 402C of FIG. 4. The entire data structure may optionally be validated based on the transformation information (act 403).

Accordingly, a mechanism is described for expressing or associating valid transformations associated with a component. In this specific example just described, the valid transformations are static. However, the valid transformations may also be dynamic or dependent on certain context. For example, it may be valid for a component of a data structure to be encrypted while in transit between two network locations, but if the data structure is above the encryption layer at either the source or destination, it may not be valid for that component to be encrypted.

For instance, suppose that the data structure 200 of FIG. 2 represents a message in a first stage of existence (also referred to herein as "stage one"). Whenever circumstances change such that acceptable valid forms of the data structure change, the data structure may be said to move from one stage of existence to the next. For instance, suppose the data structure is a message that is to be transmitted from a source computing system to a destination computing system. While the message is still above transport layer of the source computing system, there may be a set of rules that define the original form of the data structure. Accordingly, the data structure may be said to be in a first stage of existence. However, during transmission, the data structure may be expected to optionally have some of its original components compressed and/or encrypted.

Accordingly, a different set of structural rules may apply to determine that the data structure has an acceptable form while in this interim state. Accordingly, the data structure may be said to be in a second stage as it is in an interim stage. There may be, in fact, multiple interim stages, as the acceptable forms of the data structure change over the lifetime of the data structure. Note that if the acceptable forms of the data structure change, the data structure moves from one stage to the next, even if the data structure itself has not changed.

Figure 5A:
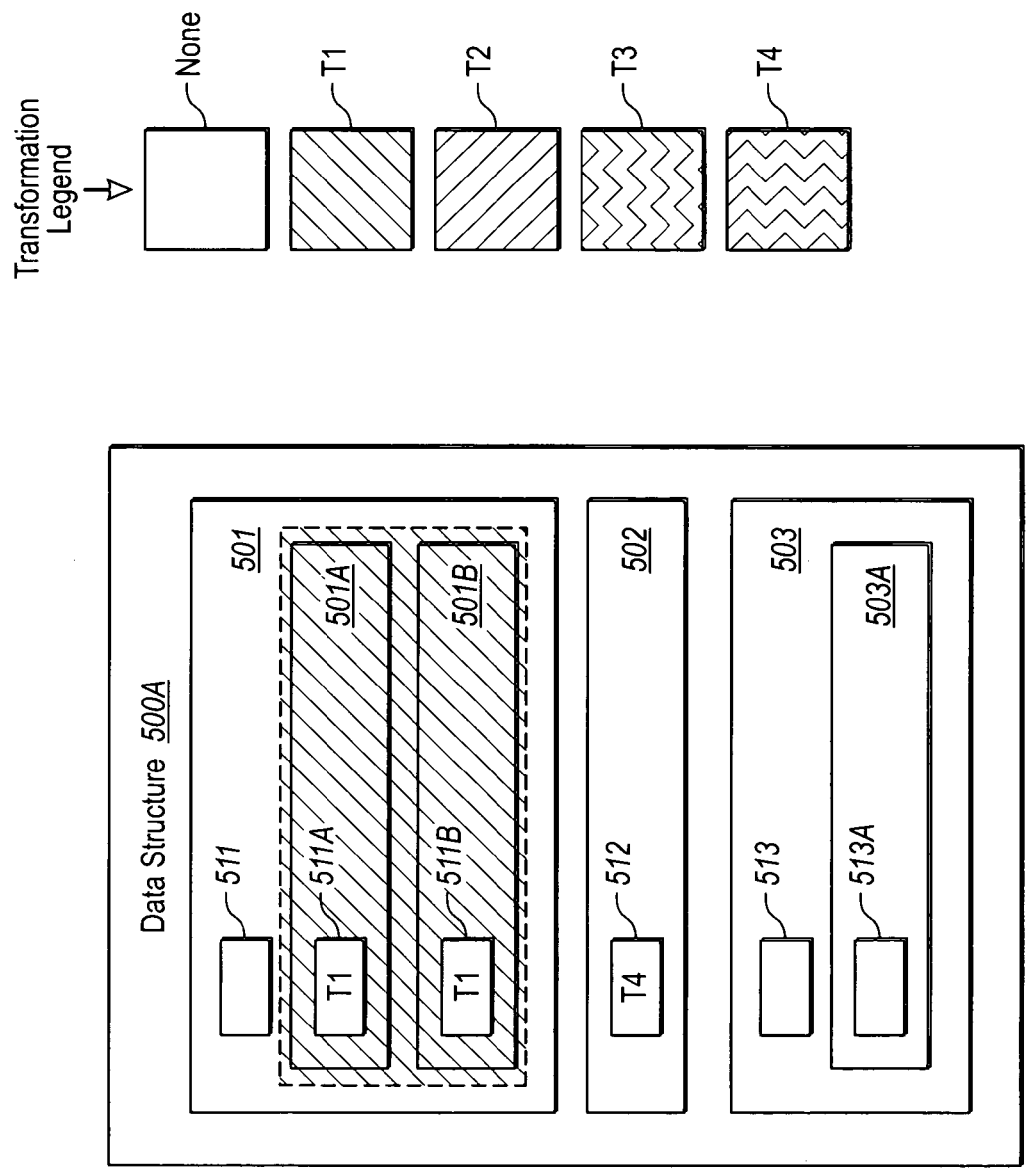
FIG. 5A illustrates the data structure of FIG. 2 in a second stage in which a portion of the data structure has been subjected to a transformation.

In FIG. 2, none of the components are transformed, and thus the data structure is in a first stage of existence. FIG. 5A, on the other hand, represents a data structure 500A, which may represent the data structure 200 in a second stage of existence (also referred to herein as "stage two") after one or more transformed are performed. In this example, the blocks representing transformation information 511, 513 and 513A are clear (without grid marking), symbolizing that there are no acceptable transformations for the corresponding components 501, 503 and 503A in the second stage illustrated in FIG. 5A. Note that this is much more restrictive that the transformations allowed for the corresponding components in stage one illustrated in FIG. 2. Since none of the components 501, 503 and 503A is transformed in stage two in FIG. 5A, the data structure 500A is so far valid.

Continuing with the example of FIGS. 2 and 5A, the block representing transformation information 512 in FIG. 5A represents that transform T4 is a valid transform for component 502 in stage two as well, representing no change in the set of valid transforms since stage one. Since component 502 is not transformed in stage two shown in FIG. 5A, the data structure 500A is still valid.

Continuing, the blocks representing transformation information 511A and 511B in FIG. 5A represent that transform T1 is the only valid transform for respective components 501A and 501B in stage two. This is a little more restrictive than the transforms that were allowed for these same components in stage one shown in FIG. 2. However, as illustrated in FIG. 5A, the components 501A and 501B have been subject to only transform T1, which is a valid transformation for stage two. Accordingly, the data structure 200 is a valid data structure.

FIG. 5B illustrates the data structure 500B, which represents the data structure 200 in a third stage of existence (hereinafter also referred to as "stage three"). Here, in addition to the continuation of components 501A and 501B remaining transformed using transformation T1, component 502 is transformed using transformation T3, and components 503 and 503A are transformed using transformation T2.

In this third stage, the block representing transformation information 511 indicates that transformation T1 remains the only valid transformation for the component 501 in stage three, thereby representing no change from stage one, but being more permissive than stage two in which no transforms were allowed for component 501. However, since transform 501 is also not transformed in stage three, the component 501 is valid.

The block representing transformation information 511A and 511B indicates that transformation T1 and T2 are now both valid transformations for the respective components 501A and 501B in stage three. This represents no change from stage one, but is more permissive than stage two in which only transform T1 was allowed for these components 501A and 501B. Here, the components 501A and 501B remain transformed using transformation T1. Accordingly, components 501A and 501B are still valid.

The block representing transformation information 512 indicates that transformation T4 remains a valid transformation for the respective component 502 in stage three. This represents no change from stages one and two. However, component 502 is illustrated as being transformed using transformation T3, not transformation T4. Accordingly, component 502 is not a valid component. This demonstrates that even with the mechanism for expressing valid transformations for a component described herein, there may still be times when the transformation of a component is not recognized as being valid. However, this situation may be changed if desired by altering the transformation information such that the transformation T3 is an acceptable transformation for component 502 in stage three. This compares to the prior art method of having to draft and disseminate an alternative schema.

The block representing transformation information 513 indicates that transformation T2 is now a valid transformation for the respective component 503 in stage three. This represents a completely different transformation list than was present for stage one in FIG. 2 when transformation T1 was the only valid transformation for component 203, but represents a more permissive list that was present for stage two in FIG. 5A when there were no valid transformations for component 503. Here, the component 503 is transformed using transform T2. Accordingly, component 503 is still valid.

The block representing transformation information 513A indicates that transformation T2 is now a valid transformation for the respective component 503A in stage three. This represents a more restrictive transformation list than was present for stage one in FIG. 2 when transformations T1 and T2 were both valid transformations for component 203A, but represents a more permissive list that was present for stage two in FIG. 5A when there were no valid transformations for component 503A. Here, the component 503A is transformed using transform T2. Accordingly, component 503A is still valid.

Accordingly, the principles of the present invention also allow the expression of valid transformations to be dependent on context such as the particular stage of existence that the data structure is in. For instance, in one embodiment, the data structure may be a message that is transmitted from one application on one network node to another application on the other network node. In its processing through the protocol stack of the source computing system, transmission via potentially multiple intermediary computing systems, and processing up through the protocol stack of the destination computing system, the data structure components may undergo many different transformations. The context-sensitive transformation information may be used to identify valid transformations for each stage during the processing and transmission of the message.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having stored thereon a plurality of computer-executable instructions that, when executed by one or more processors of a computing system, cause the computing system to perform a method for formulating a data structure of a particular type that has a particular schema used for validation, permitting components of the data structure to be optionally transformed while retaining the ability to validate the data structure, the method comprising:

an act of formulating a data structure that includes a plurality of components, wherein the data structure is of a particular type that has a particular schema used for validation; and an act of adding transformation information to the data structure that is sufficient to identify one or more transformations that may occur on at least one component of the data structure, such that after the one or more transformations occur, which cause the data structure to be transformed in contravention of the particular schema, the data structure, including the at least one transformed component, is still enabled to be validated with the added transformation information according to the particular schema without modifying the at least one transformed component and even though the data structure having the one or more transformations causes the data structure to be transformed in contravention of the particular schema.

2. A computer program product in accordance with claim 1, wherein the transformation information is first transformation information, the at least one component is a first component of the data structure, and the one or more transformations are first one or more transformations, the method further comprising:

an act of adding second transformation information to the data structure that is sufficient to identify a second one or more transformations that may occur on a second component of the data structure, wherein the second one or more transformations has at least one transformation that is not the same as the first one or more transformations.

3. A method, performed by a processor of a computer, for accessing a data structure of a particular type that has a particular schema used for validation, permitting components of the data structure to be optionally transformed while retaining the ability to validate the data structure, the method comprising:

an act of the processor accessing a data structure that is stored in memory of the computer and that includes a plurality of components, wherein the data structure is of a particular type that has a particular schema used for validation, wherein one or more of the plurality of components is transformed such that the data structure is in contravention of the particular schema;

an act of the processor identifying transformation information in the accessed data structure that is sufficient to identify one or more transformations that may occur on at least one component of the data structure such that the data structure, including the at least one transformed component, is enabled to be validated with the identified transformation information according to the particular schema, even when the data structure is transformed in contravention of the particular schema, and without modifying the at least one transformed component of the data structure; and an act of the processor validating the data structure based on the transformation information included in the data structure.

4. A method in accordance with claim 3, wherein the data structure is a hierarchically structured data structure in which any given one of the plurality of components may have zero or more child components that are also part of the plurality of components.

5. A method in accordance with claim 4, wherein the data structure is a Simple Object Access Protocol (SOAP) envelope.

6. A method in accordance with claim 3, wherein the transformation information in the data structure that is sufficient to identify one or more transformations that may occur comprises an expressed identification of the one or more transformations that may be used without any external information to identify at least one of the one or more transformations.

7. A method in accordance with claim 3, wherein the transformation information in the data structure that is sufficient to identify one or more transformations that may occur comprises an expression correlated to the one or more transformations, wherein the expression may be used with information external to the data structure to identify the one or more transformations.

8. A method in accordance with claim 3, wherein the transformation information in the data structure that is sufficient to identify one or more transformations that may occur comprises an expression of the identity of the at least one component of the data structure, wherein the expression of the component identity implies the identity of the one or more transformations with or without the presence of information external to the data structure.

9. A method in accordance with claim 3, wherein the transformation information is first transformation information, the at least one component is a first component of the data structure, and the one or more transformations are first one or more transformations, the method further comprising:

an act of identifying second transformation information in the data structure that is sufficient to identify a second one or more transformations that may occur on a second component of the data structure, wherein the second one or more transformations has at least one transformation that is not the same as the first one or more transformations.

10. A method in accordance with claim 3, wherein the one or more transformations are a plurality of transformations including at least a first transformation and a second transformation, the method further comprising:

an act of identifying a first context for a permitted use of the first transformation; and an act of identifying a second context for a permitted use of the second transformation.

11. A method in accordance with claim 10, wherein the permitted use of the first transformation is that the first transformation may be used in one or more stages of existence of the data structure.

12. A method in accordance with claim 11, wherein the data structure is a message that is subject to transformation at various stages of transmission from a source to a destination, wherein the one or more stages of the existence of the data structure comprising one or more stages of the various stages of the transmission.

13. A method in accordance with claim 3, wherein the one or more transformations include a transformation category that includes a plurality of specific autonomous transformations.

14. A method in accordance with claim 13, wherein the plurality of specific autonomous transformations includes a plurality of compression transformations.

15. A method in accordance with claim 13, wherein the plurality of specifically autonomous transformations includes a plurality of digital signing transformations.

16. A method in accordance with claim 13, wherein the plurality of specifically autonomous transformations includes a plurality of encryption transformations.

17. One or more computer-readable storage media having stored thereon a protocol configured to include the following acts:

an act of generating data structures comprising:

an act of formulating data structures that includes a plurality of components, wherein the data structure is of a particular type that has a particular schema used for validation, and an act of adding transformation information to data structures that is sufficient to identify one or more transformations that occur on at least one component of the data structure, such that after the one or more transformations occur, which cause the data structure to be transformed in contravention of the particular schema, the data structure, including the at least one transformed component, is still enabled to be validated with the added transformation information according to the particular schema without modifying the at least one transformed component and even though the data structure having the one or more transformations causes the data structure to be transformed in contravention of the particular schema; and an act of accessing data structures comprising:

an act of accessing data structures that includes a plurality of components, wherein the data structure is of a particular type that has a particular schema used for validation wherein one or more of the plurality of components is transformed such that the data structure is in contravention of the particular schema; and an act of identifying transformation information in the accessed data structures that is sufficient to identify one or more transformations that may occur on at least one component of the data structure such that the data structure, including the at least one transformed component, may be validated with the identified transformation information according to the particular schema, even when the data structure is transformed in contravention of the particular schema, and without modifying the at least one transformed component of the data structure.

* * * * *